United States Patent
Mansfield-Marcoux et al.

(10) Patent No.: US 9,440,743 B2
(45) Date of Patent: Sep. 13, 2016

(54) CABIN AIR COMPRESSOR OUTLET DUCT

(75) Inventors: Danielle Mansfield-Marcoux, Enfield, CT (US); Mark Vignali, Northfield, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 1071 days.

(21) Appl. No.: 13/570,905

(22) Filed: Aug. 9, 2012

(65) Prior Publication Data

US 2014/0045415 A1 Feb. 13, 2014

(51) Int. Cl.
| | |
|---|---|
| F16L 39/00 | (2006.01) |
| B64D 13/00 | (2006.01) |
| F16L 41/02 | (2006.01) |
| F04D 25/16 | (2006.01) |
| F04D 29/40 | (2006.01) |

(52) U.S. Cl.
CPC ............. B64D 13/00 (2013.01); F04D 25/16 (2013.01); F04D 29/403 (2013.01); F16L 41/023 (2013.01)

(58) Field of Classification Search
USPC .............. 285/129.1, 129.2, 188, 131, 125.1, 285/132.1
See application file for complete search history.

(56) References Cited

U.S. PATENT DOCUMENTS

| | | | | |
|---|---|---|---|---|
| 2,065,523 | A * | 12/1936 | Groeniger | 285/129.2 |
| 3,346,887 | A * | 10/1967 | Sommer | 4/211 |
| 3,495,281 | A * | 2/1970 | Palowsky | 4/696 |
| 3,630,547 | A * | 12/1971 | Hartshorn, Jr. | 285/129.1 |
| 3,711,128 | A * | 1/1973 | Hezel et al. | 285/129.1 |
| 3,894,302 | A * | 7/1975 | Lasater | 4/696 |
| 4,597,404 | A * | 7/1986 | Van Marcke | 137/1 |
| 4,691,760 | A | 9/1987 | Gupta et al. | |
| 5,228,726 | A * | 7/1993 | Brown et al. | 285/187 |
| 6,024,639 | A | 2/2000 | Scherer et al. | |
| 6,257,003 | B1 | 7/2001 | Hipsky | |
| 6,478,340 | B1 * | 11/2002 | Butler | 285/131.1 |
| 6,629,428 | B1 | 10/2003 | Murry | |
| 6,681,591 | B2 | 1/2004 | Defrancesco et al. | |
| 6,928,832 | B2 | 8/2005 | Lents et al. | |
| 7,114,524 | B2 * | 10/2006 | Houston et al. | 138/37 |
| 7,849,702 | B2 | 12/2010 | Parikh | |
| D654,990 | S * | 2/2012 | Coley | D23/266 |
| 8,485,561 | B2 | 7/2013 | Guo | |
| 9,085,981 | B2 * | 7/2015 | Lee et al. | |
| 2007/0251211 | A1 | 11/2007 | Daris et al. | |
| 2009/0084896 | A1 | 4/2009 | Boucher et al. | |
| 2009/0117840 | A1 | 5/2009 | Kresser et al. | |
| 2011/0045370 | A1 | 2/2011 | Westenberger et al. | |
| 2012/0011878 | A1 | 1/2012 | Hipsky | |

FOREIGN PATENT DOCUMENTS

| | | |
|---|---|---|
| CN | 2893367 Y | 4/2007 |
| CN | 201753814 U | 3/2011 |

OTHER PUBLICATIONS

Chinese Office Action for CN Application No. 201310414758.5, dated Jan. 4, 2015, pp. 1-15.

\* cited by examiner

*Primary Examiner* — Aaron Dunwoody
(74) *Attorney, Agent, or Firm* — Cantor Colburn LLP

(57) ABSTRACT

A cabin air compressor outlet duct includes an outlet portion, a first inlet portion fluidly connected to the outlet portion, and a second inlet portion fluidly connected to the outlet portion and joined to the first inlet through a curvilinear surface having a bend radius between about 2.50 inches (6.35 cm) and about 2.60 inches (6.60 cm).

2 Claims, 4 Drawing Sheets

CABIN AIR COMPRESSOR OUTLET DUCT

BACKGROUND OF THE INVENTION

Exemplary embodiments pertain to the art of environmental control systems and, more particularly, to a cabin air compressor outlet duct.

Aircraft include environmental control systems (ECS) that provide conditioned air to passenger compartments, cockpits and the like. In many cases, engine compressor bleed air is supplied to the ECS. Temperature, pressure, and humidity of the bleed air generally depends upon which compressor extraction location is coupled to the ECS. In other cases, air for the ECS is provided by electrically driven compressors. In either case, the air is passed to portions of the aircraft through an outlet duct fluidly coupled to the compressor.

BRIEF DESCRIPTION OF THE INVENTION

Disclosed is a cabin air compressor outlet duct includes an outlet portion, a first inlet portion fluidly connected to the outlet portion, and a second inlet portion fluidly connected to the outlet portion and joined to the first inlet through a curvilinear surface having a bend radius between about 2.50 inches (6.35 cm) and about 2.60 inches (6.60 cm).

Also disclosed is a cabin air system including a first cabin air compressor having a first outlet, a second cabin air compressor having a second outlet, an ozone converter including an inlet, and a cabin air compressor outlet duct interconnecting the first and second cabin air compressors and the ozone converter. The cabin air compressor outlet duct includes an outlet portion fluidly connected to the inlet of the ozone converter, a first inlet portion fluidly connected to the first outlet and the outlet portion, and a second inlet portion fluidly connected to the second outlet and the outlet portion. The second inlet portion is joined to the first inlet portion through a curvilinear surface having a bend radius between about 2.50 inches (6.35 cm) and about 2.60 inches (6.60 cm).

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
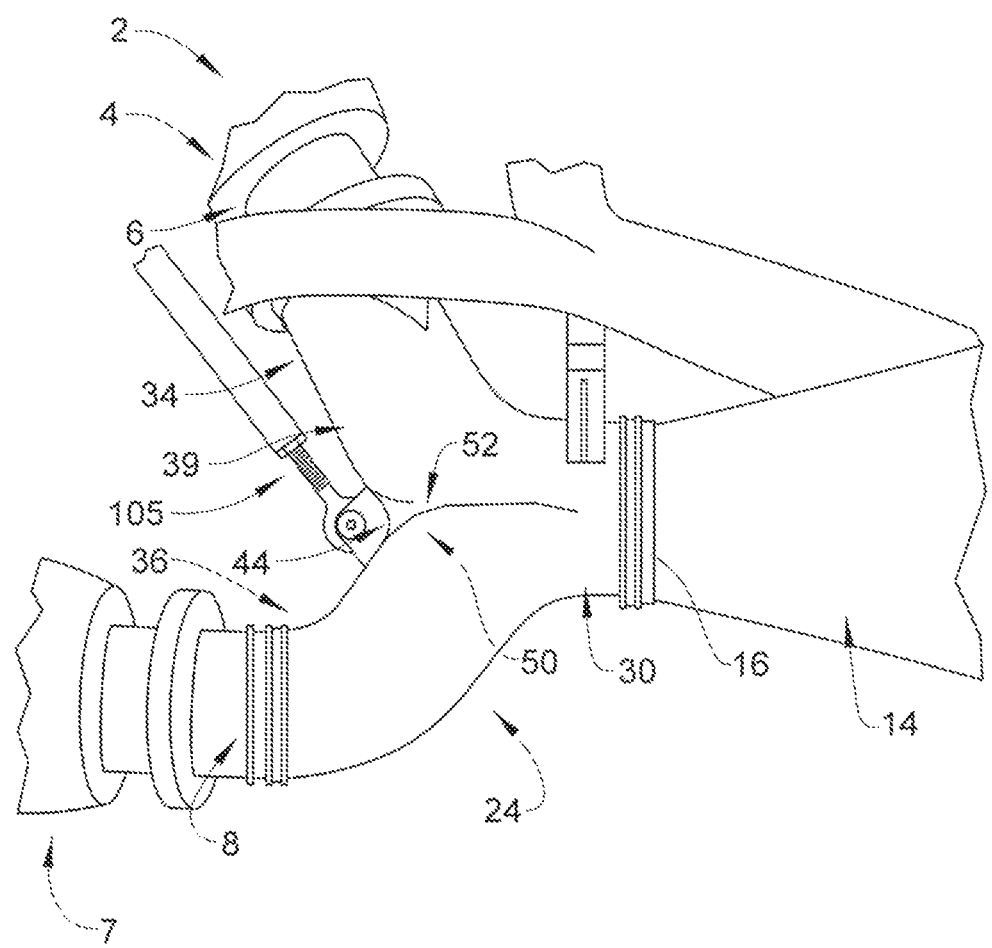
FIG. 1 is a perspective view of a portion of a cabin air system including a cabin air compressor fluidly linked to an ozone converter through a cabin air compressor outlet duct in accordance with an exemplary embodiment.
Figure 2:
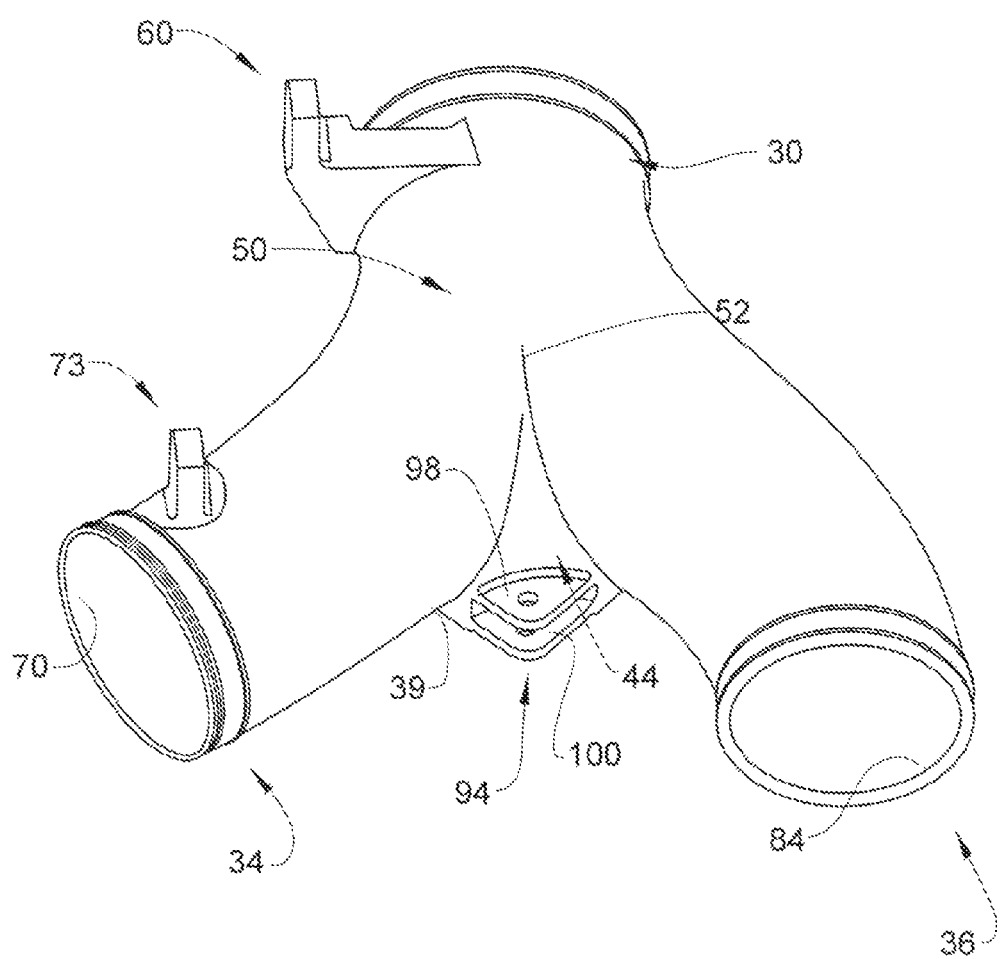
FIG. 2 is a perspective view of the cabin air compressor outlet duct of FIG. 1.

A cabin air system in accordance with an exemplary embodiment is indicated generally at 2 in FIGS. 1 and 2. Cabin air system 2 includes a first cabin air compressor 4 having a first outlet 6 and a second cabin air compressor 7 having a second outlet 8. Cabin air system 2 also includes an ozone converter 14 having an inlet 16. Cabin air compressor 4 is fluidly coupled to ozone converter 14 through a cabin air compressor outlet duct 24. Cabin air compressor outlet duct 24 includes an outlet portion 30 fluidly connected to inlet 16 of ozone converter 14. Cabin air compressor outlet duct 24 also includes a first inlet portion 34 fluidly coupled to first outlet 6 and a second inlet portion 36 fluidly connected to second outlet 8. In accordance with one aspect of an exemplary embodiment, cabin air compressor outlet duct 24 includes a wall thickness of between about 0.090 inches (0.228 cm) and about 0.150 inches (0.381 cm). In accordance with another aspect of an exemplary embodiment, cabin air compressor outlet duct 24 includes a wall thickness of about 0.120 inches (0.304 cm).

In accordance with an exemplary embodiment, first inlet portion 34 is mechanically linked to second inlet portion 36 though a curvilinear surface 39. In accordance with one aspect of the exemplary embodiment, curvilinear surface 39 includes a bend radius 44 of between about 2.50 inches (6.35 cm) and about 2.60 inches (6.60 cm). In accordance with another aspect of an exemplary embodiment, bend radius 44 is about 2.55 inches (6.47 cm). Cabin air compressor outlet duct 24 also includes a fillet 50 that extends from outlet portion 30 to bend radius 44. Fillet 50 includes a fillet radius 52 of about 2.50 inches (6.35 cm). In accordance with an aspect of the exemplary embodiment, cabin air compressor outlet duct 24 includes a wall thickness to bend radius ratio of between about 0.090 inches/2.50 inches to about 0.150 inches/2.60 inches.

Figure 3:
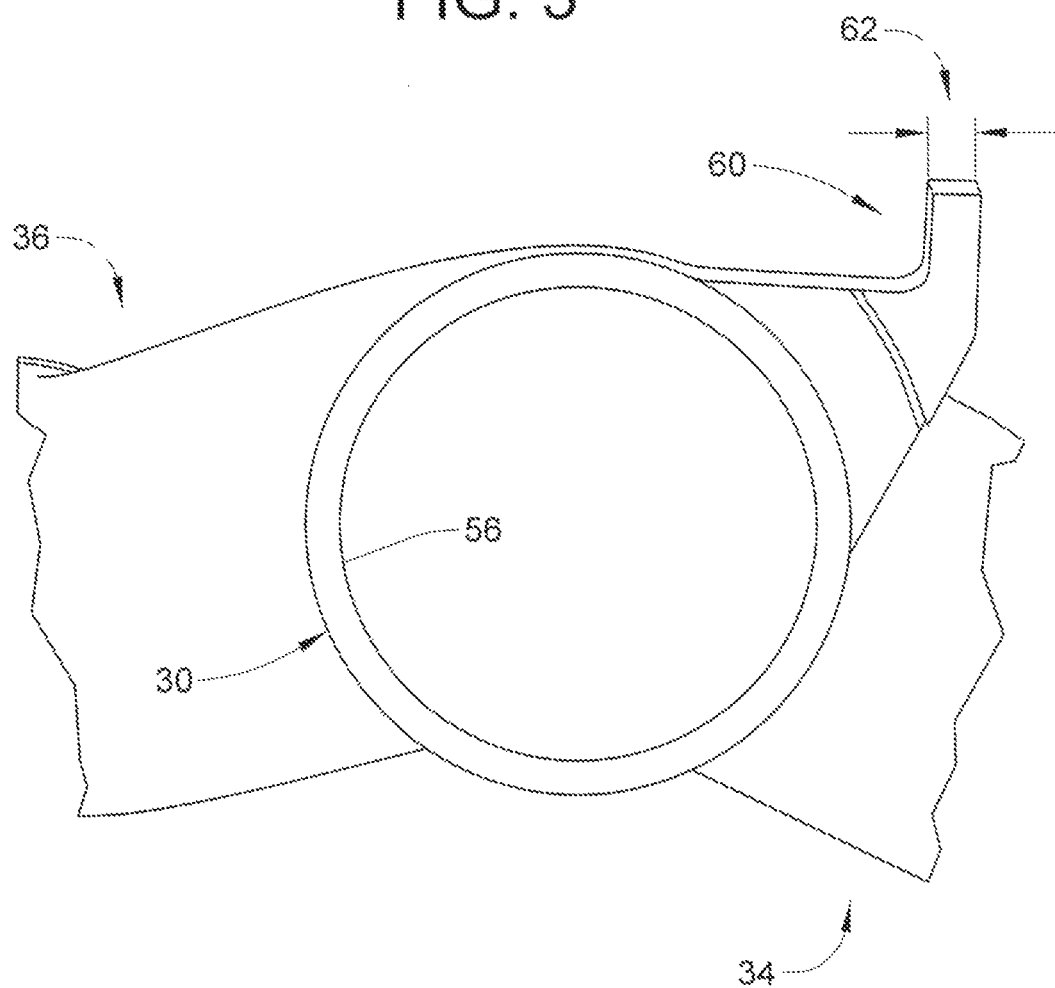
FIG. 3 is a plan view of an outlet portion of the cabin air compressor outlet duct of FIG. 2.

As shown in FIG. 3, outlet portion 30 includes an opening 56. In accordance with one aspect of the exemplary embodiment, opening 56 includes a diameter of between about 5.860 inches (14.884 cm) and about 5.660 inches (14.376 cm). In accordance with another aspect of the exemplary embodiment, the diameter of opening 56 is about 5.760 inches (14.630 cm). Outlet portion 30 is also shown to include a mounting flange member 60 that is configured to support cabin air compressor outlet duct 24 to cabin air compressor 4. In accordance with one aspect of the exemplary embodiment, mounting flange member 60 has a thickness 62 of between about 0.595 inches (1.511 cm) and about 0.605 (1.536 cm). In accordance with another aspect of the exemplary embodiment, thickness 62 is about 0.600 inches (1.524 cm). In accordance with another aspect of the exemplary embodiment, cabin air compressor outlet duct 24 includes a wall thickness to mounting flange member thickness ratio of between about 0.090 inches/0.605 inches to about 0.0150 inches/0.595 inches. In accordance with yet another aspect of the exemplary embodiment, cabin air compressor outlet duct 24 includes a diameter of opening 56 to mounting flange member thickness ratio of between about 5.660 inches/0.595 to about 5.860 inches/0.605 inches.

Figure 4:
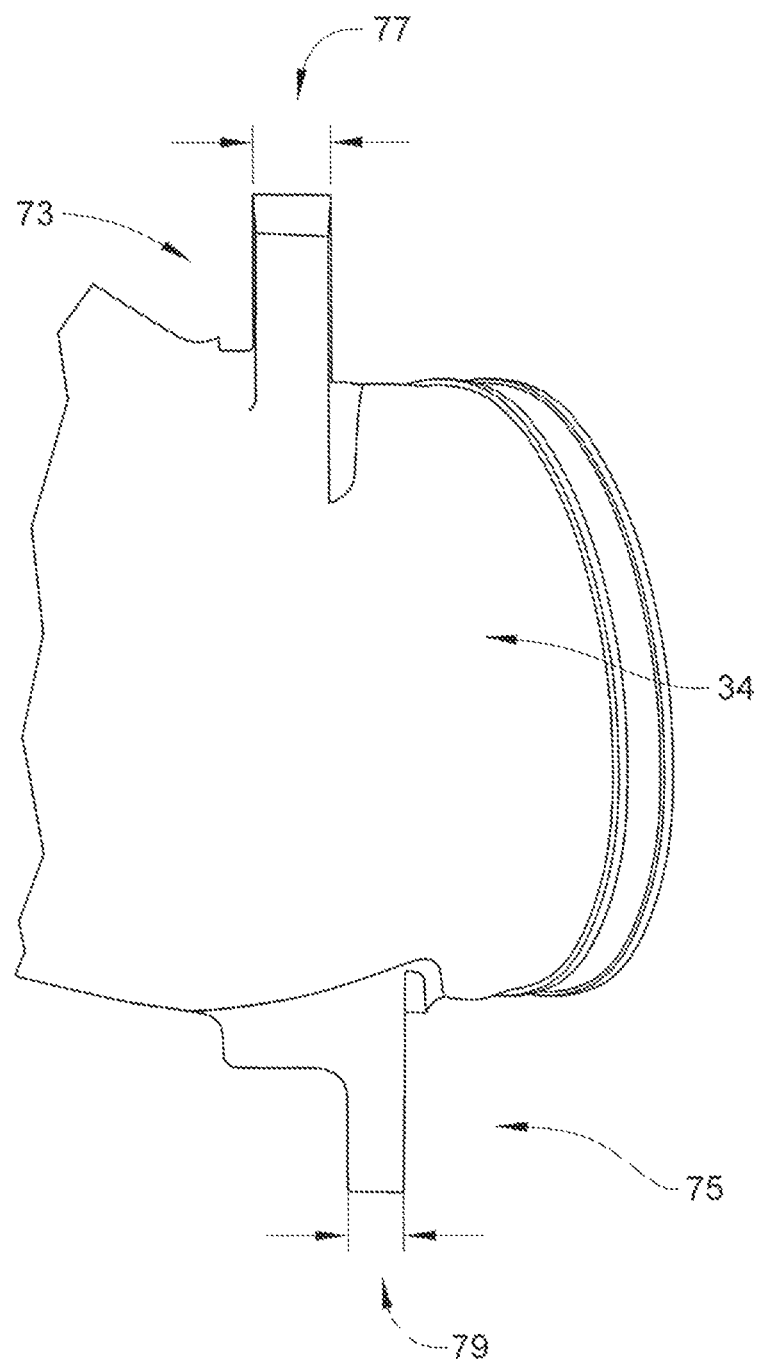
FIG. 4 is a plan view of an inlet portion of the cabin air compressor outlet duct of FIG. 2.

As shown in FIG. 4, first inlet portion 34 includes an opening 70 having a diameter of between about 4.750 inches (12.065 cm) and about 4.770 inches (12.116 cm). In accordance with another aspect of the exemplary embodiment, opening 70 includes a diameter of about 4.760 inches (12.090 cm). First inlet portion 34 also includes a first mounting flange element 73 and a second mounting flange element 75. First mounting flange element 73 is arranged at first inlet portion 34 substantially opposite to second mounting flange element 75. In accordance with an aspect of the exemplary embodiment, first mounting flange element 73 includes a thickness 77 of between about 0.480 inches (1.219 cm) and between about 0.490 inches (1.244 cm). In accordance with yet another aspect of the exemplary embodiment, thickness 77 is about 0.485 inches (1.231 cm). Second mounting flange element 75 includes a thickness 79 that is substantially identical to thickness 77. First and second mounting flange elements 73 and 75 support cabin air compressor outlet duct 24 relative to cabin air compressor 4. Further, second inlet portion 36 includes an opening 84 that is substantially similar to the diameter of opening 70.

In accordance with another aspect of the exemplary embodiment, cabin air compressor outlet duct 24 includes a wall thickness to mounting flange element thickness ratio of between about 0.090 inches/0.480 inches and about 0.150 inches/0.490 inches. In accordance with an aspect of the exemplary embodiment, cabin air compressor outlet duct 24 includes a diameter of opening 70 to mounting flange element thickness ratio of between about 4.750 inches/0.480 inches to about 4.770 inches/0.490 inches. In accordance with still another aspect of the exemplary embodiment, cabin air compressor outlet duct 24 includes a wall thickness to diameter of opening 70 ratio of between about 0.090 inches/4.750 inches to about 0.150 inches/4.770 inches.

Cabin air compressor outlet duct 24 also includes a clevis assembly 94 provided on curvilinear surface 39 and aligned with fillet 50. Clevis assembly 94 includes a first clevis member 98 and a second clevis member 100. First and second clevis members 98 and 100 are spaced from one another and include openings (not separately labeled) that are aligned. Clevis assembly 98 connects with an adjustable strut 105 that provides additional support for cabin air compressor outlet duct 24.

At this point it should be understood that the exemplary embodiments provide a cabin air compressor outlet duct that is configured to withstand forces associated with incorporation into an aircraft. The particular dimensions of, for example the bend radius and the fillet radius ensures that the cabin air compressor outlet duct possesses desired mechanical properties that are resistant to vibration and acceleration stresses. In addition, while the first and second inlet ducts are described as having openings possessing a similar geometry, the openings may be of different dimensions. Further, while the mounting flange elements are described as being on the first inlet member, the second inlet member may also include mounting flange elements. In the event mounting elements are provided on the second inlet member, the first inlet member may be devoid of mounting flange elements. Also the thicknesses of the first and second mounting flange elements may vary relative to one another.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A cabin air system comprising:
   a first cabin air compressor including a first outlet;
   a second cabin air compressor having a second outlet;
   an ozone converter including an inlet; and
   a cabin air compressor outlet duct interconnecting the first and second cabin air compressors and the ozone converter, the cabin air compressor outlet duct including:
      an outlet portion fluidly connected to the inlet of the ozone converter;
      a first inlet portion fluidly connected to the first outlet and the outlet portion; and
      a second inlet portion fluidly connected to the second outlet and the outlet portion, the second inlet portion being joined to the first inlet portion through a curvilinear surface having a bend radius between about 2.50 inches (6.35 cm) and about 2.60 inches (6.60 cm).

2. The cabin air system according to claim 1, wherein the curvilinear surface includes a bend radius of about 2.55 inches (6.47 cm).

* * * * *